United States Patent
Patterson et al.

(10) Patent No.: US 12,379,226 B2
(45) Date of Patent: *Aug. 5, 2025

(54) GENERATING SCOUTING OBJECTIVES

(71) Applicant: Waymo LLC, Mountain View, CA (US)

(72) Inventors: Katharine Patterson, San Francisco, CA (US); Joshua Herbach, San Francisco, CA (US); David Silver, San Carlos, CA (US); David Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,304

(22) Filed: Dec. 11, 2023

(65) Prior Publication Data

US 2024/0125619 A1   Apr. 18, 2024

Related U.S. Application Data

(63) Continuation of application No. 16/989,485, filed on Aug. 10, 2020, now Pat. No. 11,885,639.

(51) Int. Cl.
   *G05D 1/228*   (2024.01)
   *G01C 21/00*   (2006.01)
   *G05D 1/00*    (2024.01)

(52) U.S. Cl.
   CPC ..... *G01C 21/3841* (2020.08); *G01C 21/3822* (2020.08); *G05D 1/0088* (2013.01); *G05D 1/228* (2024.01)

(58) Field of Classification Search
   None
   See application file for complete search history.

(56) References Cited

U.S. PATENT DOCUMENTS

| | | | |
|---|---|---|---|
| 10,203,701 B2 | 2/2019 | Kurdi et al. | |
| 10,254,764 B2 * | 4/2019 | Laubinger | G08G 1/22 |
| 11,391,587 B1 * | 7/2022 | Joshi | G05D 1/0088 |
| 2014/0277900 A1 | 9/2014 | Abhyanker | |
| 2017/0192437 A1 | 7/2017 | Bier et al. | |

(Continued)

FOREIGN PATENT DOCUMENTS

WO   2017176550 A1   10/2017

OTHER PUBLICATIONS

Harris; Mark, Oct. 14, 2014, IEEE Spectrum, Technology Insider News, https://spectrum.ieee.org/how-googles-autonomous-car-passed-the-first-us-state-selfdriving-test (Year: 2014).

*Primary Examiner* — Daniel L Greene
*Assistant Examiner* — Robert L Pinkerton
(74) *Attorney, Agent, or Firm* — Botos Churchill IP Law

(57) ABSTRACT

Aspects of the disclosure relate to generating scouting objectives in order to update map information used to control a fleet of vehicles in an autonomous driving mode. For instance, a notification from a vehicle of the fleet identifying a feature and a location of the feature may be received. A first bound for a scouting area may be identified based on the location of the feature. A second bound for the scouting area may be identified based on a lane closest to the feature. A scouting objective may be generated for the feature based on the first bound and the second bound.

20 Claims, 13 Drawing Sheets

(56) References Cited

U.S. PATENT DOCUMENTS

| | | |
|---|---|---|
| 2019/0143697 A1 | 5/2019 | Kameyama et al. |
| 2019/0143967 A1* | 5/2019 | Kutila et al. |
| 2019/0156678 A1* | 5/2019 | Cole .................... G06V 20/52 |
| 2019/0243372 A1 | 8/2019 | Huval et al. |
| 2019/0259182 A1 | 8/2019 | Sarukkai et al. |
| 2020/0117565 A1 | 4/2020 | Ponnuvel et al. |
| 2020/0180612 A1 | 6/2020 | Finelt et al. |
| 2020/0217964 A1 | 7/2020 | Chen et al. |
| 2020/0233415 A1* | 7/2020 | Panzica ............. G01C 21/3461 |
| 2020/0241530 A1 | 7/2020 | Caveney |
| 2020/0249032 A1* | 8/2020 | Lee .................... G09B 29/006 |
| 2020/0249689 A1 | 8/2020 | Tatsubori et al. |
| 2021/0027487 A1* | 1/2021 | Lawlor ................ G01C 11/34 |
| 2022/0028277 A1 | 1/2022 | Patnaik et al. |

\* cited by examiner

GENERATING SCOUTING OBJECTIVES

CROSS REFERENCE TO RELATED APPLICATIONS

The present application is a continuation of U.S. patent application Ser. No. 16/989,485, filed Aug. 10, 2020, now U.S. Pat. No. 11,885,639, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

In addition, humans have historically "scouted" out areas by walking or driving them in order to capture images or make drawings. These have been used to create maps and other types of information. Typically, such scouting is performed by assigning persons to complete certain tasks or by having the vehicles drive around a service area randomly or in specific patterns when not otherwise required to be used for transportation services.

BRIEF SUMMARY

Aspects of the disclosure provide a method of generating scouting objectives in order to update map information used to control a fleet of vehicles in an autonomous driving mode. The method includes receiving, by one or more processors of a scouting system, a notification from a vehicle of the fleet identifying a feature and a location of the feature; identifying, by the one or more processors, a first bound for a scouting area based on the location of the feature; identifying, by the one or more processors, a second bound for the scouting area based on a lane closest to the feature; and generating, by the one or more processors, a scouting objective for the feature based on the first bound and the second bound.

In one example, the notification identifies the feature as missing from a local version of map information used to control the vehicle in the autonomous driving mode. In another example, the notification identifies the feature as moved. In another example, the notification identifies the feature as a new feature that does not appear in the map information. In another example, the notification identifies a second location corresponding to an extent to which the vehicle was able to observe the feature, and the first bound is identified further based on the second location. In another example, the first bound is identified further based on a perceptive range of the vehicle. In another example, the second bound is identified further based on where vehicles are able to enter or exit a roadway to which the lane belongs. In another example, the second bound is identified further based on a location where the lane meets a next intersection. In another example, generating the scouting objective includes identifying an area between the first bound and the second bound to be scouted. In this example, generating the scouting objective further includes determining an observation location for the scouting objection which defines from where the area is to be scouted. In addition, the observation includes a lane requirement that a scouting vehicle approach the area at least one lane away from the area. In addition or alternatively, the observation includes a lane requirement that a scouting vehicle approach the area opposite of a flow of traffic of a lane adjacent to the area. In another example, generating the scouting objective further includes determining a vehicle configuration for the scouting objective. In this example, the vehicle configuration includes no passengers in the vehicle. In addition or alternatively, the vehicle configuration includes that a scouting vehicle has a particular software version. In addition or alternatively, the vehicle configuration includes a test driver who is able to take control of a scouting vehicle. In another example, the method also includes using the scouting objective to generate additional scouting objectives based on a type of the feature of the notification. In another example, the method also includes providing the scouting objective to one or more vehicles of the fleet in order to enable the one or more vehicles to capture data at the area. In another example, the method also includes using the captured data to update the map information and providing the updated map information to the vehicles of the fleet. In another example, the method also includes tracking the status of the scouting objective, and when the status of the scouting objective indicates that the scouting objective has not been completed within a pre-determined period of time, flagging the scouting objective for review.

DETAILED DESCRIPTION

Overview

Figure 1:
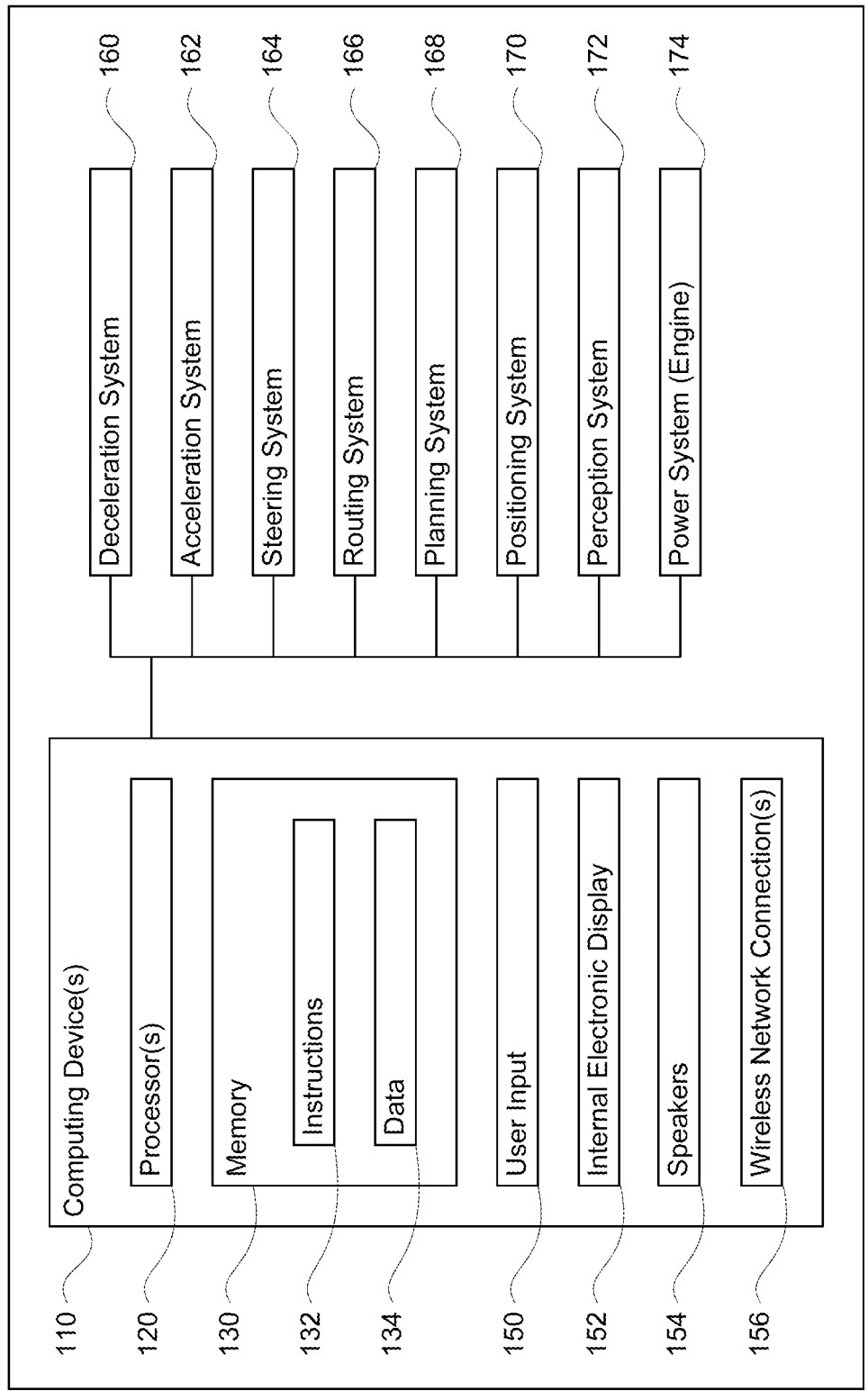
FIG. 1 is a functional diagram of an example vehicle in accordance with an exemplary embodiment.

The technology relates to using a fleet of autonomous vehicles to perform scouting tasks in order to ensure accuracy and freshness of map information. Typically, such scouting is performed by assigning persons to complete certain tasks or by having the vehicles drive around a service area randomly or in specific patterns when not otherwise required to be used for transportation services. However, for a fleet of autonomous vehicles which is also providing passenger and cargo transportation services, this can be a slow process which requires significant time and resources to complete. To address these problems, a fleet management system which employs a dispatching system and a scouting system can be used to manage a fleet of vehicles and achieve various scouting tasks and objectives.

The scouting system may be configured to define scouting quests, define scouting objectives and track completion of those objectives. A scouting quest may include a plurality of scouting objectives to be completed within a given period of time or timeframe. However, while many scouting tasks such as visiting all intersections in the service area once per week, getting images of traffic lights for all intersections at night time once per month, passing through every street in the service area once per week, checking for wet or snowy areas after precipitation, passing through all construction zone areas twice per day, etc. can be generated based on pre-stored map information that identifies these features, when the world changes, such scouting tasks may not be sufficient to identify all changes.

To address this, the scouting system may leverage information from the fleet of autonomous vehicles to generate new scouting objectives. For instance, whenever a vehicle of the fleet identifies an inconsistency between the world and a local version of pre-stored map information, the scouting system may generate a new scouting objective around that inconsistency.

The vehicles of the fleet may constantly compare the features detected by their respective perception systems to pre-stored map information for localization, planning trajectories, and other purposes. As part of this comparison, the vehicle's computing devices may automatically detect when there has been a change in the world. Of course, the exact method of detection of the difference may vary. Some of these changes may be significant enough to flag and report to the scouting system by sending a notification.

The scouting system may receive the notification and generate a new scouting objective. The scouting objective may identify a feature as well as an area to scout. In some instances, the scouting system may identify a specific vehicle configuration for the scouting objective. In some instances, the notification may identify a specific point at which the missing, new or moved feature cannot be detected or alternatively, the scouting system could determine this information from the received notification and information already known about the vehicle that sent the notification such as the configuration of that vehicle's perception system. This point may be used to determine a first bound for a new scouting objective. A second bound for the scouting quest may be determined by following a flow of traffic of a lane associated with the feature from the first point and the next intersection or some location where a vehicle could enter the roadway associated with the feature. These two bounds may be used as an area to be scouted for the scouting objective.

In some instances, additional scouting objectives may be generated for certain types of features. Such additional scouting objectives may be generated using various heuristics and may be associated with the scouting objective to form a scouting task. Once the scouting objective and any additional scouting objectives are generated, these may be used to capture information about the change. The scouting system may then track the location of the vehicles of the fleet as well as the status of the scouting objectives.

The features described herein may provide for an efficient way to automatically generate scouting objectives when changes are detected. Moreover, since vehicles are able to detect changes passively and provide this information to the scouting system, this increases the speed at which scouting objectives can be generated and acted upon by other vehicles. In addition, because these new scouting objectives can be generated as a by-product of other things an autonomous vehicle might be doing while out and about, this may reduce the resources required to staff and organize other data collection efforts to confirm and update map information used by the vehicles and therefore may even streamline such operations.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

Figure 2:
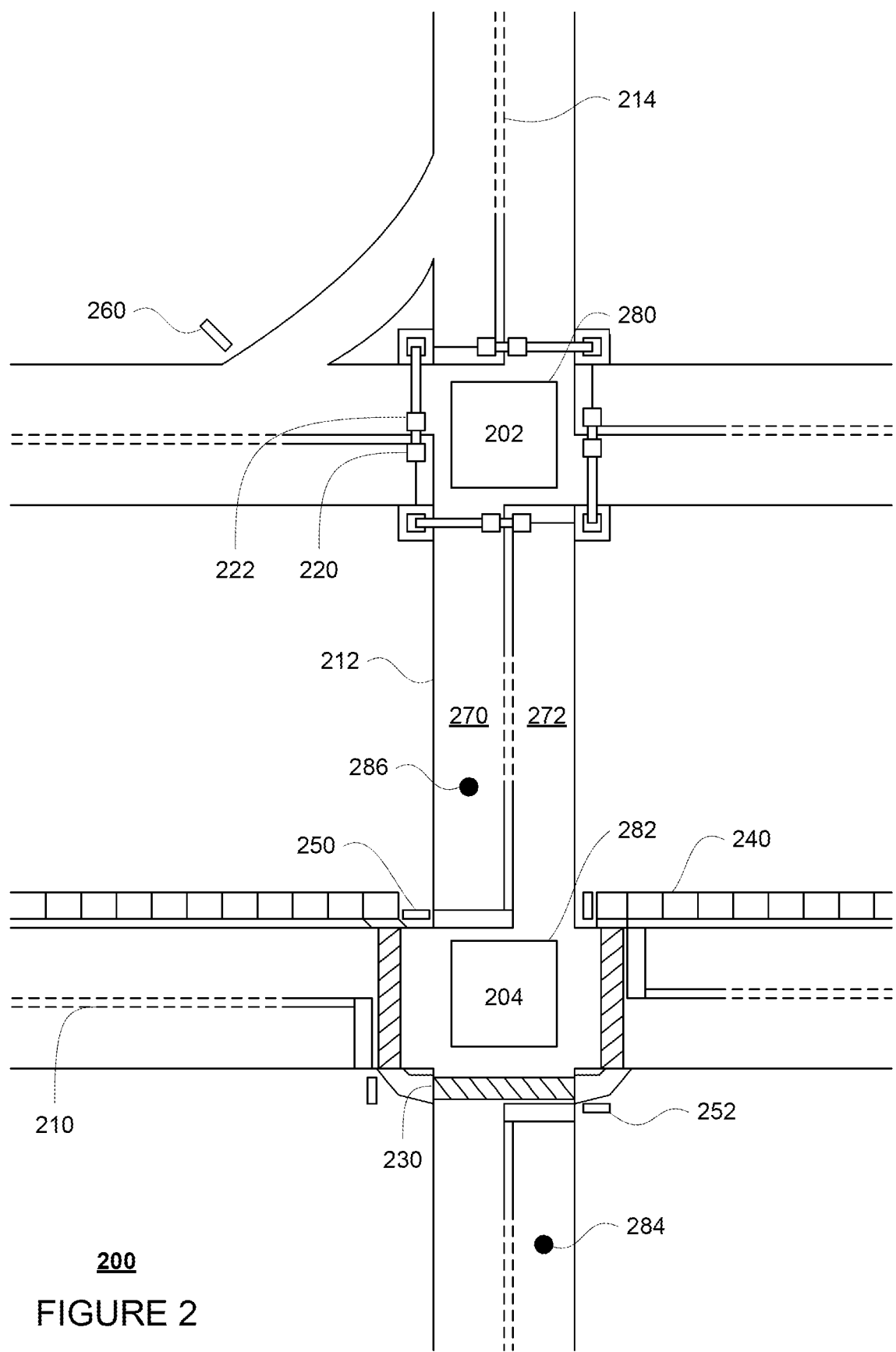
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. The map information may also store a plurality of scouting objectives and scouting quests as discussed in further detail below. In this example, polygon 280 represents a scouting objective for capturing sensor data for intersection 202, polygon 282 represents a scouting objective for capturing sensor data for intersection 204, and points 284 and 286 represent scouting objectives for capturing sensor data for stop signs 250 and 252, respectively. Although only a few scouting objectives are shown, this is merely for clarity and ease of understanding; the map information may actually include tens, hundreds or thousands of scouting objectives within the area of map information 200.

The routing system 166 may use the map information 200 to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
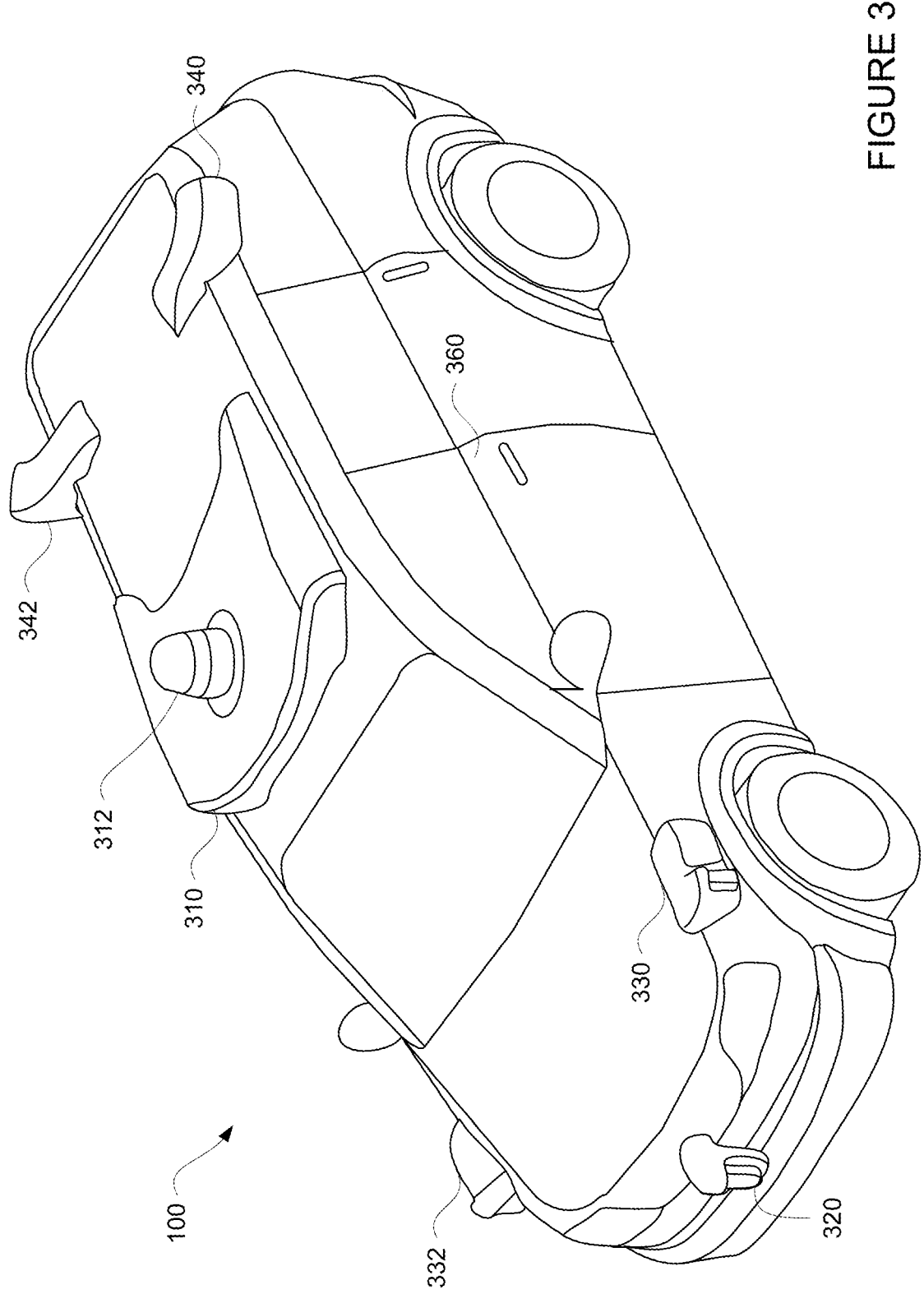
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
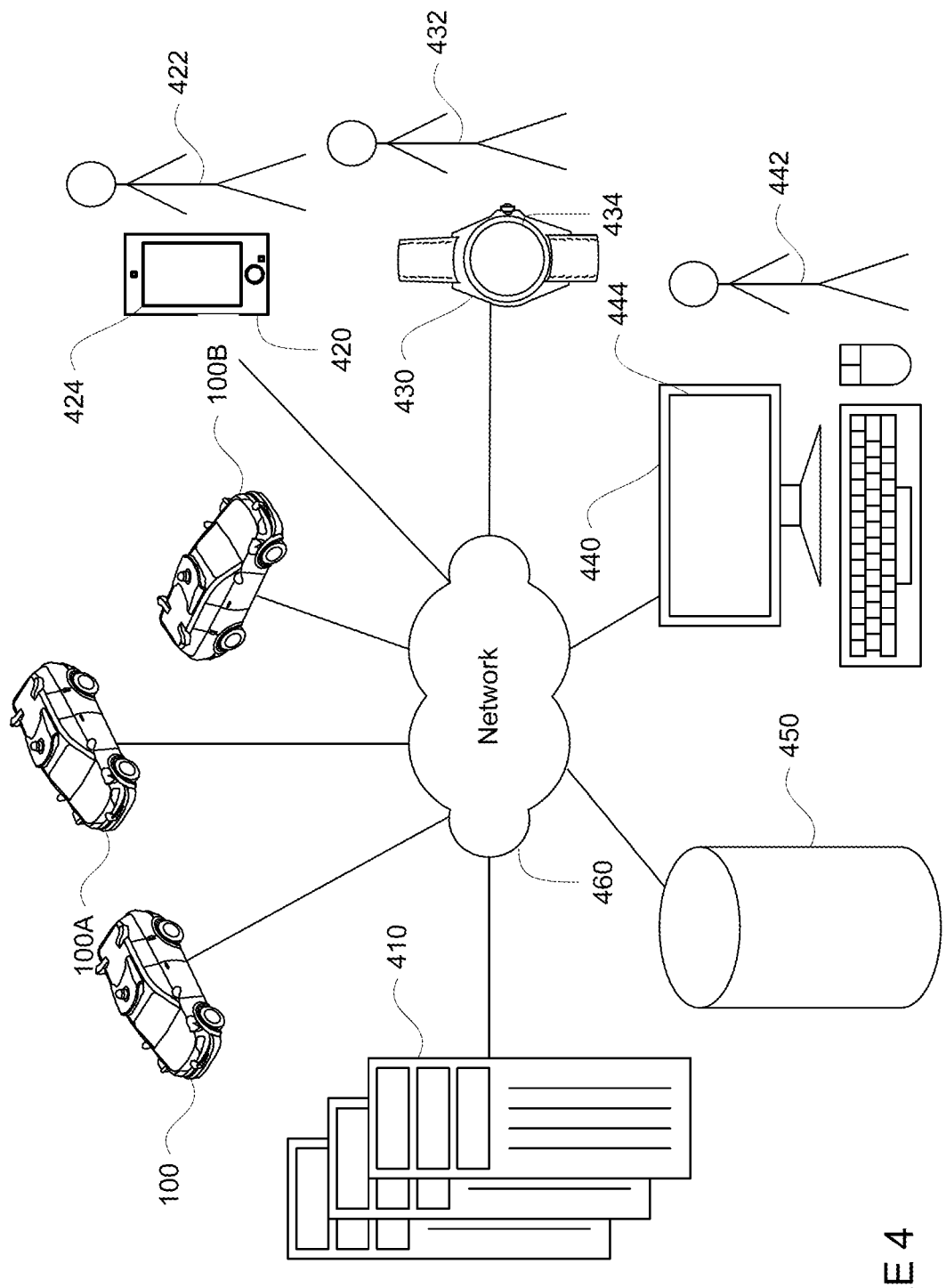
FIG. 4 is a pictorial diagram of an example system in accordance with aspects of the disclosure.
Figure 5:
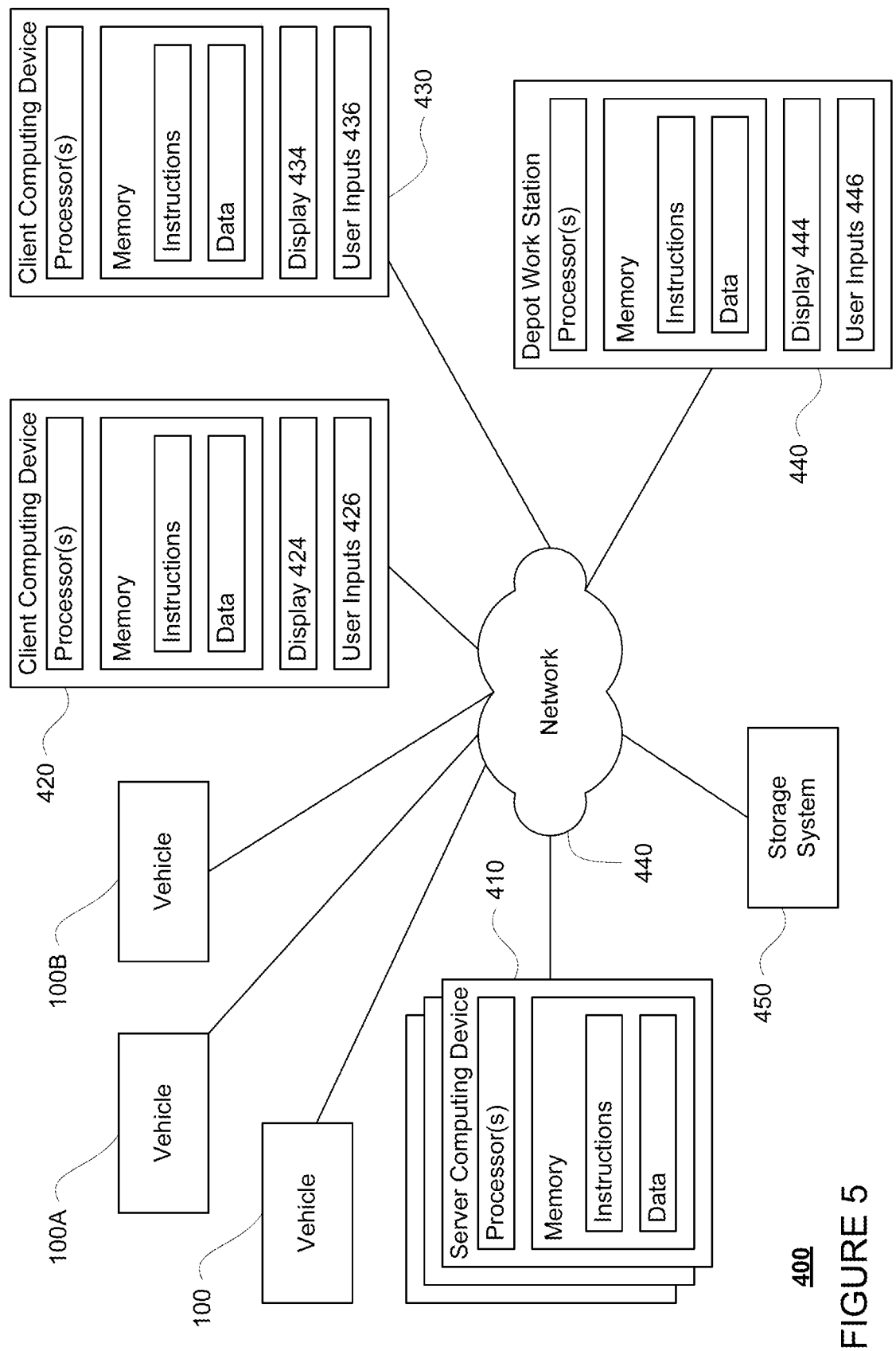
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system (hereafter fleet management system 410) which can be used to dispatch vehicles such as vehicles 100, 100A, 100B to different locations in order to pick up and drop off passengers as well as to generate and track scouting quests and objectives as discussed further below. In addition, the fleet management system 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 440 may represent a workstation for an operations person, for example, a remote assistance operator or someone who may provide remote assistance to a vehicle and/or a passenger. In other words, user 442 may represent a remote assistance operator. Although only a few passengers and remote assistance operator are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the fleet management system 410, in order to perform some or all of the features described herein.

Figure 6:
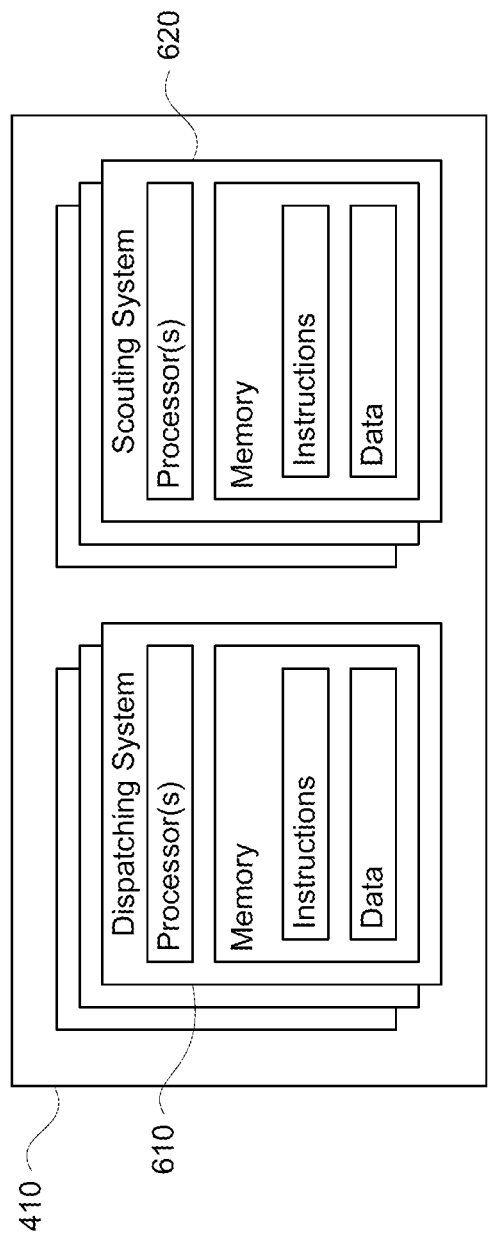
FIG. 6 is an example of a fleet management system in accordance with aspects of the disclosure.

FIG. 6 provides additional details of the fleet management system 410. In this example, the server computing devices may include a dispatching system 610 and a scouting system 620. Each of the dispatching system 610 and the scouting system 620 may include one or more computing devices configured, for instance, as shown with respect to the fleet management system 410. Although the dispatching system and the scouting system are depicted as distinct computing devices, these may be actually the same computing devices or the same group of computing devices and may be located proximate to one another or at great distances.

The dispatching system 610 may be configured to select vehicles for ride or transport services depending upon locations of the vehicles, passengers and/or cargo, destinations, etc. This information, including the locations of vehicles, status of passengers and/or cargo, destinations, etc. may be tracked, for instance, in a status table of the storage system 450. In this regard, all or part of the storage system 450 may be remote from or part of dispatching system 610 and/or fleet management system 410. The dispatching system 610 may also track the state of the vehicles using information that is periodically broadcast by the vehicles, specifically requested by the dispatching system and provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose, lane information (i.e., in what lane the vehicle is currently traveling), as well as other information, such as whether the vehicle is currently providing transportation services, experiencing any errors or problems, etc.

The scouting system 620 may be configured to define scouting quests and scouting objectives, as well as to track completion of those quests and objectives, for instance, in the storage system 450. In this regard, all or part of the storage system 450 may be remote from or part of scouting system 620 and/or fleet management system 410. A scouting quest may include a plurality of scouting objectives to be completed within a given period of time or a timeframe. For instance, a scouting quest may include visiting all unprotected left turns in a service area of the fleet at least once per week, visiting all intersections in the service area once at least per week, getting images of traffic lights for all intersections at night time at least once per month, passing through every street in the service area at least once per week, checking for wet or snowy areas after precipitation, passing through all construction zone areas at least twice per day, etc.

The scouting objectives may be inserted into map information used by the vehicles to identify and complete the scouting objectives and quests. Each scouting objective, such as the scouting objectives represented in the map information and described above with regard to FIG. 2, may generally include a location or area for a vehicle to visit in order to capture sensor data for that area. This area may be represented by a point, such as for points 284, 286, a polygon, such as for polygons 280, 282, circle (for instance represented by a point and a radius), lines between two or more points, or any other shapes. As an example, each area, point, polygon, circle, line or other shape, may be specific to a road segment and/or lane of the map information having a particular direction of travel. In this regard, by simply driving or passing through the road segment and/or lane, the vehicle is able to complete the scouting objective. The areas of the scouting objectives also may have different geometry and/or metadata depending on what type of scouting is being handled or rather what type of data is to be collected by the scouting objective.

In some instances, the scouting objectives may have certain constraints or vehicle requirements, such as certain software or hardware (e.g. sensor) versions, levels of urgency, or other constraints as discussed further below. This information may be inserted into the map information by periodically broadcasting this information to the vehicles of the fleet, such as vehicles 100, 100A, 100B, and/or downloading the data directly to the vehicles' computing devices.

Examples of scouting objectives may include intersection-based objectives, lane-level objectives, traffic light objectives, stop sign objectives, turning objectives (such as unprotected left turns, etc.), and so on. As one example, intersection-based objectives may be defined as areas such as polygons or other shapes leading up to an intersection, such as polygon 280 of FIG. 2 for intersection 202. By passing through the polygon 280, a vehicle may be able to capture sufficient sensor data for the intersection 202. As another example, maneuver-type objectives may include curves that map to lanes where precision is required to allow vehicles to complete certain types of maneuvers, such as where information about unprotected left turns, U-turns, speed limits, cul-de-sacs, merges, and other freeform navigational paths is required.

At least some of these scouting quests and/or scouting objectives may include constraints. For instance, if a scouting quest is designed to find real world changes, such as new intersections or roads before they are opened up, the scouting quest may include visiting every street within the service area once per week. Of course, the scouting objectives of this scouting quest may be constrained to visiting streets that are typically missed when performing typical transportation services from any direction. As another instance, a scouting objective may require a vehicle to visit a certain location at a certain time of day from a certain direction or perspective and/or during certain weather and/or lighting conditions. For example, if a scouting quest is designed to find changed traffic light configurations, the scouting quest may include capturing sensor data (for instance, camera images) of each traffic light in the service area once per day. In addition, the scouting objectives of this scouting quest may be constrained to capturing traffic lights from a certain perspective or direction such that the lights on the traffic lights are visible in a camera image.

As another example, a constraint could include the vehicle "turning-on" a particular functionality, for instance implemented in hardware and/or software, as the vehicle approaches a location. For instance, a vehicle could be required to turn on certain modes of sensing or computing when reaching a location, such as a machine learning model to detect traffic light configuration changes or new stop signs that is too expensive to run all the time, but can be run briefly as the vehicle passes through certain intersections in order to collect information for a scouting objective. Alternatively, rather than including explicit constraints in the scouting objective themselves, the scouting system could send commands to the vehicles to turn on the functionality as the vehicle approaches a location of a particular scouting objective.

As noted above, the scouting system 620 may also track the completion of scouting objectives and scouting quests. For instance, using the status messages from the vehicles, the scouting system may track the movements of the vehicles. From this, the scouting system may determine whether a vehicle has passed through a scouting objective and mark that scouting objective as completed. This may also include confirming whether the vehicle that completed the scouting objective has met any vehicle requirements for that scouting objective.

The status of the scouting objectives may be stored in a scouting database, for instance in a visit table of storage system 450. As an example, an entry in the table may include metadata about the visit including the vehicle identifier of the vehicle that visited, the autonomy mode of the vehicle at the time (to ensure the proper sensors were engaged to capture the sensor data), the time of the visit, etc. This information may allow engineers or other systems to retrieve the needed sensor data from the vehicles.

In addition, certain information in the table may be periodically refreshed. For instance, for a given quest which must be performed within a given period of time such as 7 days, the scouting objectives within the table may be "reset" to not complete after 7 days from the last time the scouting objective was visited. Of course, the table may still store the data for each prior visit for record keeping purposes.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As described above, the scouting system 620 may be configured to define scouting quests, scouting objectives and track completion of those objectives. However, when the world changes, such scouting quests and objectives may not be sufficient to identify all changes. To address this, the scouting system may leverage information from the fleet of autonomous vehicles to generate new scouting objectives. For instance, whenever a vehicle of the fleet, such as vehicles 100, 100A, 100B, identifies an inconsistency between the world and a local version of pre-stored map information, the scouting system may generate a new scouting objective around that inconsistency.

Figure 10:
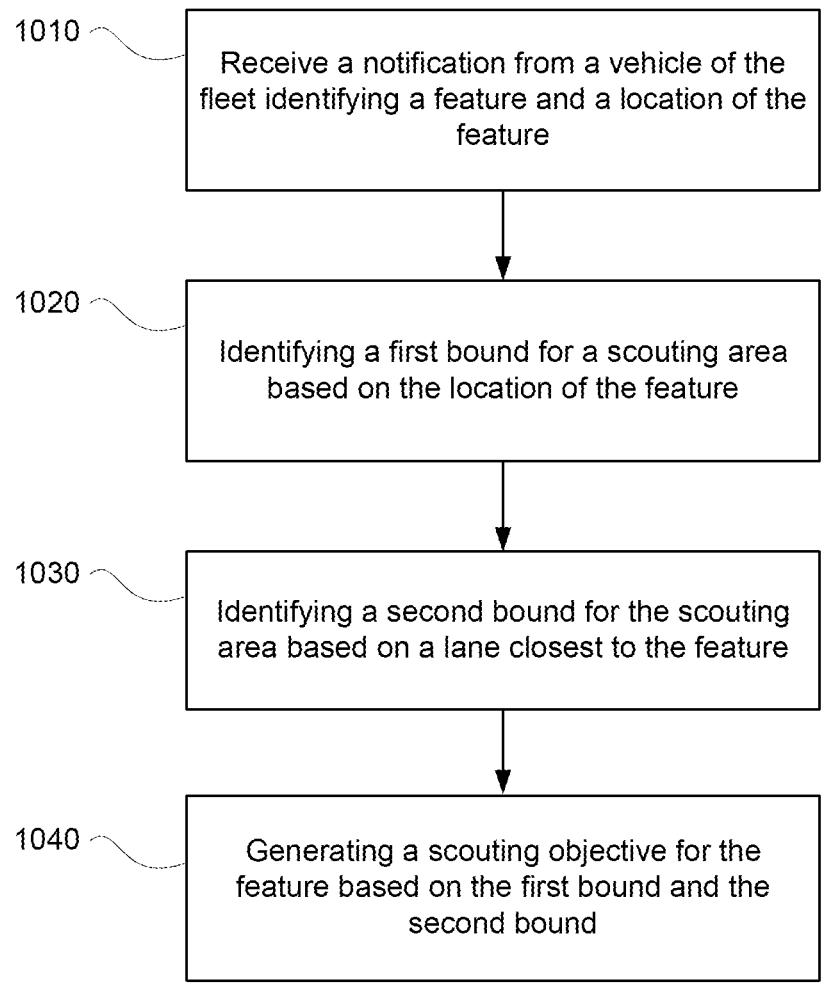
FIG. 10 is an example flow diagram in accordance with aspects of the disclosure.

FIG. 10 provides an example flow diagram 1000 for generating scouting objectives in order to update map information used to control a fleet of vehicles in an autonomous driving mode, which may be performed by one or more processors of one or more computing devices such as the processors of server computing devices 410. At block 1010, a notification from a vehicle of the fleet identifying a feature and a location of the feature is received.

For instance, the vehicles of the fleet, such as vehicles 100, 100A, 100B, may constantly compare the features detected by their respective perception systems to pre-stored map information for localization, planning trajectories, and other purposes. As part of this comparison, the vehicle's computing devices may automatically detect when there has been a change in the world. Of course, the exact method of detection of the difference may vary. Examples of changes may include, for instance, changes to the road edge (such as new or moved curbs), changes to lanes lines (such as location, shape, solid or dashed), changes in lane topology (such as added lanes, removed lanes, lanes connected differently), changes to traffic controls (such as new, removed or moved traffic lights or stop signs), changes in stop lines (such as new, removed or moved stop lines), changes to speed bumps (such as new, removed or moved speed bumps), changes to parking lanes or parking spots (such as new, removed or moved parking lanes or parking spots), etc.

Some of these changes may be significant enough to flag and report to the scouting system by sending a notification. For example, if a vehicle, such as vehicles 100, 100A, 100B, approaches an intersection and detects a curb in a location that does not line up (i.e. is not within a few centimeters or more or less) from an expected location of a curb within the pre-stored map information, the vehicle's computing devices may send a notification to the scouting system 620.

Figure 7:
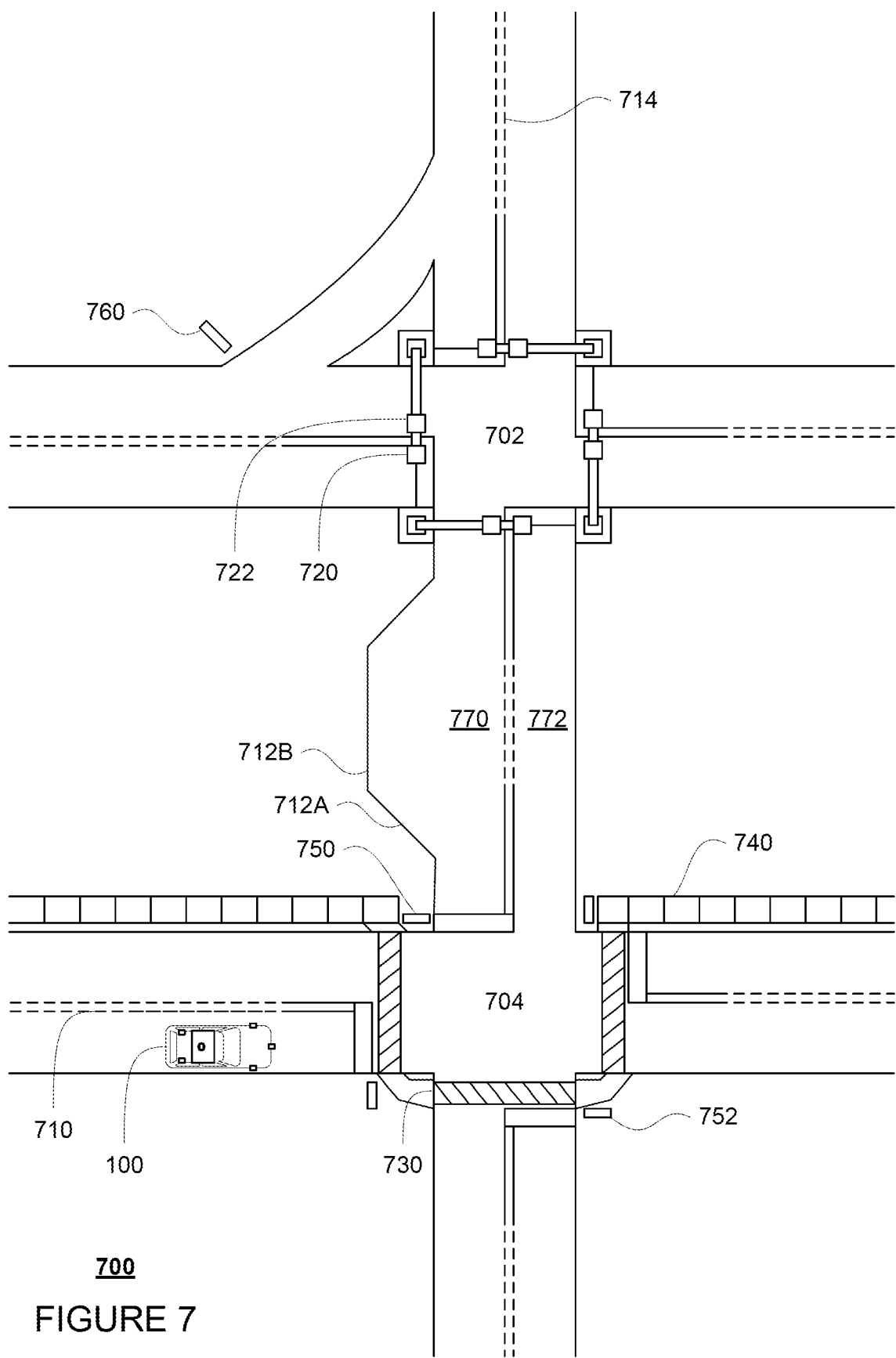
FIG. 7 is an example view of a vehicle and a geographic area in accordance with aspects of the disclosure.

For instance, FIG. 7 depicts vehicle 100 being maneuvered on a section of roadway 700 including intersections 702 and 704. In example of FIG. 7, intersections 702 and 704 correspond to intersections 202 and 204 of the map information 200, respectively. In this example, lane lines 710 and 714 correspond to the shape, location, and other characteristics of lane lines 210 and 214, respectively. Similarly, crosswalk 730 corresponds to the shape, location, and other characteristics of crosswalk 230, respectively; sidewalks 740 correspond to sidewalks 240; traffic signal lights 720, 722 correspond to traffic signal lights 220, 222, respectively; stop signs 750, 752 correspond to stop signs 250, 252, respectively; and yield sign 760 corresponds to yield sign 260.

As vehicle 100 approaches intersection 702, the various systems of vehicle 100 may determine that there is a change or difference between the detected location of one or more features and its corresponding location of the feature in the map information. For example, the location of lane line 712A, 712B may be different, for instance greater than some acceptable threshold difference, than the location of lane line 212 in the map information. Alternatively, the difference may be so great that the various systems of vehicle 100 are unable to identify a corresponding feature for lane line 712A, 712B or for lane line 212. In this example, the contour of the lane 270 has changed, for instance because parking or a shoulder area has been added to form lane 770. This may cause the vehicle 100 to send a notification to the scouting system 620.

The notification may provide some minimal amount of information such as characteristics of the feature (e.g. location, type, etc.). The notification may also include information about the change such as whether the feature is no longer detected, whether the feature is a new feature that does not appear in the map information, or whether a feature (such as a lane line or a curb) appears to have moved. The notification may also include information about the farthest extent to which the vehicle's perception system was able to detect the missing, new or moved feature. Returning to the examples of FIGS. 7 and 8, the notification may identify the lane line 212 (for instance, via an identifier of the map information 200) and or the location of the lane line 712A, 712B. In some instances, if the various systems of vehicle 100 are able to make this determination, the notification may also identify that the lane line 212 appears to have moved to the location of lane line 712A, 712B.

The scouting system 620 may receive the notification and generate a new scouting objective. The scouting objective may identify a feature (i.e. the feature that has changed), an area to scout, and an "observation location" for a scouting vehicle. In some instances, the scouting system may identify a specific vehicle configuration for the scouting objective as discussed further below.

Figure 8:
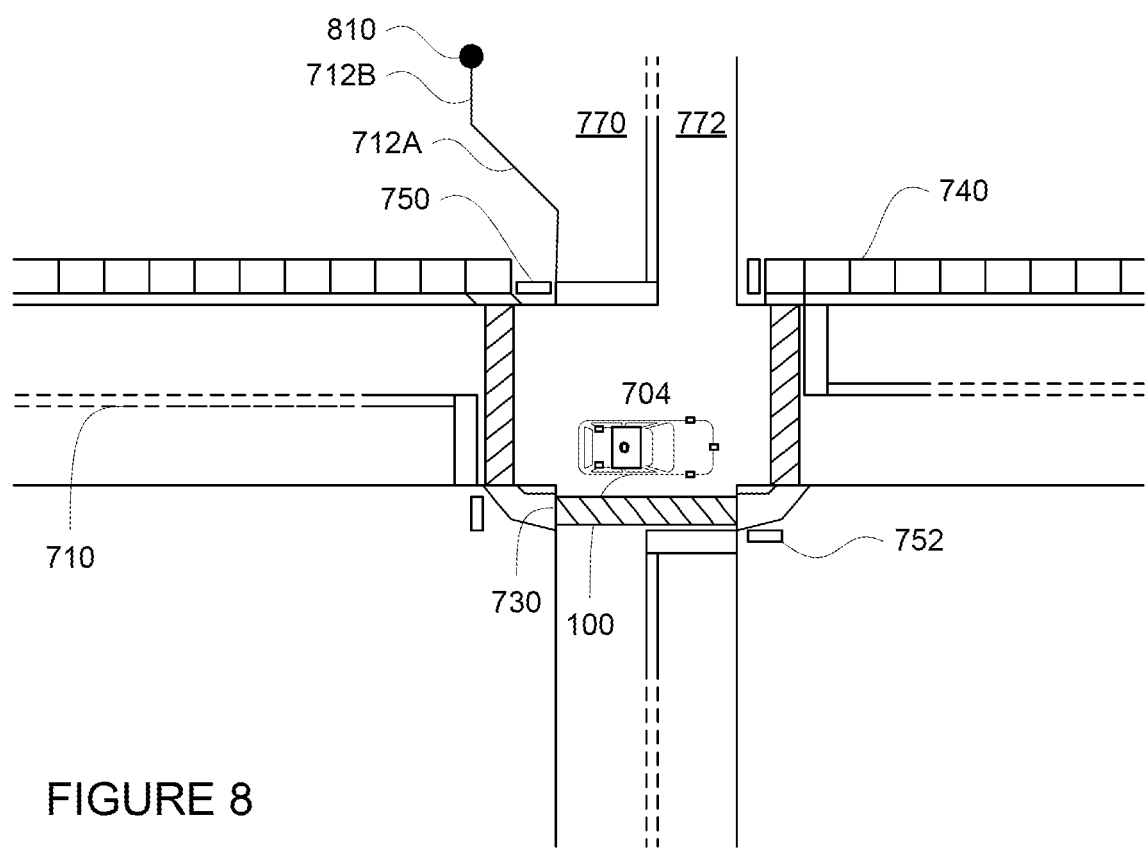
FIG. 8 is an example view of a vehicle and a portion of a geographic area perceived by sensors of a perception system of the vehicle in accordance with aspects of the disclosure.

Returning to FIG. 10, at block 1020, a first bound for a scouting area is identified based on the location of the feature. In some instances, the notification may identify a specific point at which the missing, new or moved feature cannot be detected (i.e. the edge of a perception range) or alternatively, the scouting system 620 could determine this information from the received notification and information already known about the vehicle that sent the notification such as the configuration of that vehicle's perception system. This point may be used by the scouting system 620 to determine a first bound for a new scouting objective. For example, FIG. 8 represents features within a portion of the area 700 that is detected by perception system 172 of the vehicle 100 as the vehicle 100 passes through the intersection 702 (or intersection 202 as defined in the map information 200). In this example, the point 810 represents the farthest distance to which the perception system 172 is able to detect the lane line 712A, 712B.

Returning to FIG. 10, at block 1030, a second bound for the scouting area is identified based on a lane closest to the feature. A second bound for the scouting quest may be determined by the scouting system 620 by following a flow of traffic of a lane associated with the feature (e.g. a closest lane) from the first point and the prior or next intersection or some location where a vehicle could enter the roadway associated with the feature (such as a driveway or side street). For example, the closest lane to lane line 712A, 712B is lane 770 or lane 270 (as represented in the map information 200). Starting from the point 810, the next intersection (following the direction in which the lane line 712A was not visible to the sensors of perception system 172 of the vehicle 100) would be intersection 702 or intersection 202. Thus, the second bound may be an edge of the intersection 702 or 202 or some point on the boundary of that intersection such as the point 910 depicted in FIG. 9.

Figure 9:
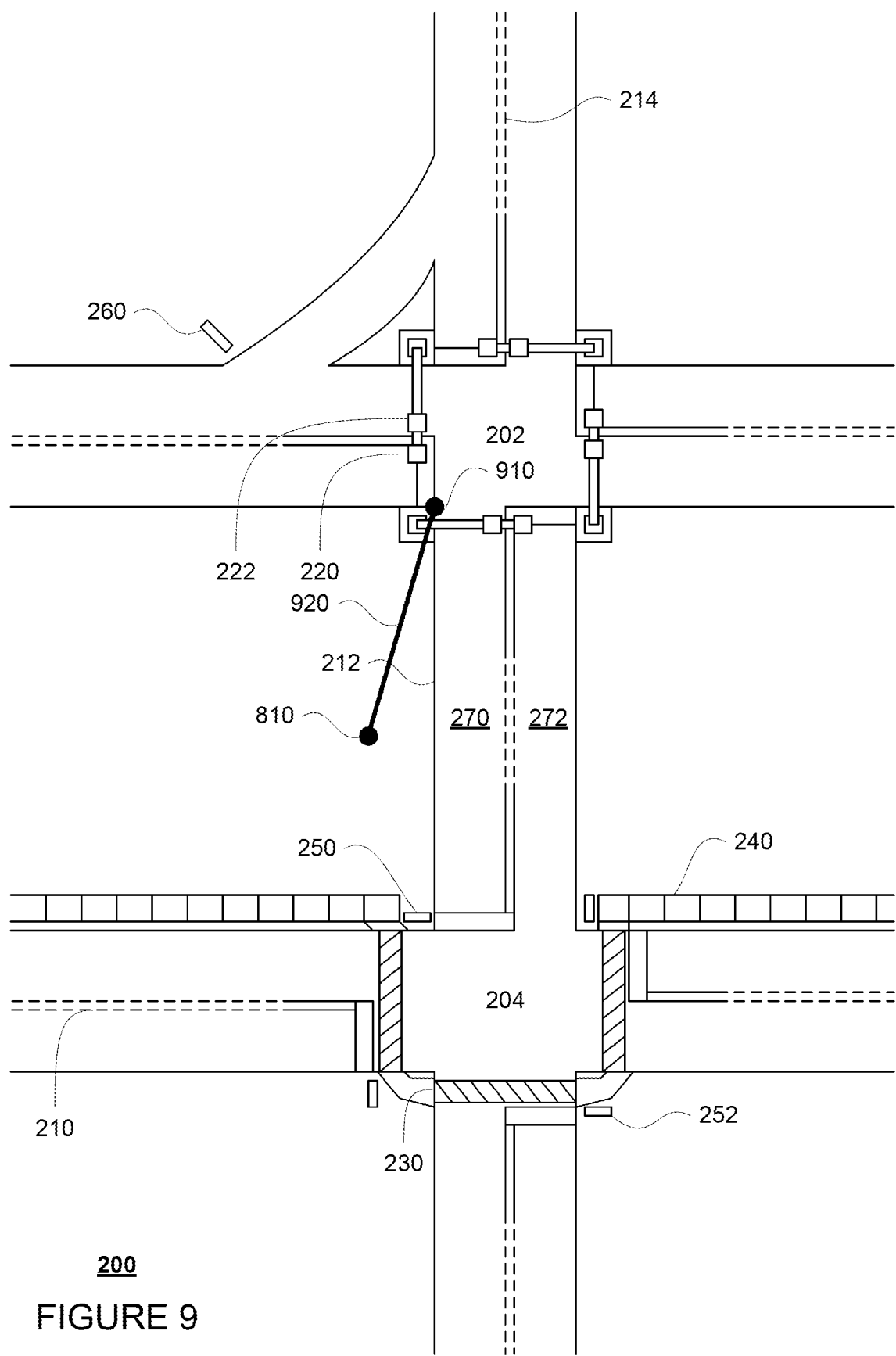
FIG. 9 is an example of map information in accordance with aspects of the disclosure.

Returning to FIG. 10, at block 1040, a scouting objective for the feature is generated based on the first bound and the second bound. In other words, these first and second bounds may be used to define an area to be scouted for the scouting objective. In this regard, a scouting objective effectively breaks the map information into discrete sections from where a feature is missing or appears until a location where a vehicle can enter and exit a roadway to which a lane closest to the feature (that changed) belongs. In this regard, as shown in FIG. 9, a scouting objective 920 may be generated for the area between the location of point 910 and the location of point 810. In this example, the scouting objective 920 is depicted as a line with two endpoints corresponding to the first and second bounds, depending upon the type of change (or feature which is changed), the scouting objective may be a 2 or 3-dimensional area.

In addition to an area to be scouted, the scouting objective may also define an observation location from where the area is to be scouted. The observation location may be selected in order to allow the vehicle's perception system to be able to observe the area while reducing risk to a scouting vehicle and others. For instance, there may be some value in having some distance between the vehicle and the area so that the vehicle is not so close to the area that the vehicle would be affected by the change. In this regard, the observation location may include a lane requirement that a scouting vehicle be at least one lane away from the lane associated with the feature. However, in some instances, it may be complicated or even risky for a scouting vehicle to have to respond to the change. In this regard, the scouting objective may require that the scouting vehicle approach the area opposite of the flow of traffic adjacent to the area. For example, if the feature is associated with a westbound lane, the observation location may include a lane requirement that the scouting vehicle travel in an eastbound lane. In this regard, returning to FIG. 9, the scouting objective 920 may require that vehicles of the fleet drive in lane 272 (corresponding to lane 772) when capturing sensor data in order to both put some distance between the sensors of the perception system of the vehicle capturing the sensor data and to prevent the vehicle from having to respond to the change to the lane line 212.

In some instances, a scouting objective may include an observation requirement. That is, not only may completing a scouting objective be dependent upon observing the area, but also observing a certain thing or condition in the area. This may include observing a traffic light in a certain color or successfully utilizing a new turn lane to complete a turn.

As noted above, in some instances, the scouting system may identify a specific vehicle configuration for the scouting objective. For example, the scouting system may choose vehicles without passengers to avoid inconveniencing them. As another example, the scouting system may choose to assign vehicles running a latest software version (e.g. because it may better handle uncertainty with respect to the feature of the scouting objective. As another example, the scouting system may choose to assign vehicles which include a test driver who can intervene in the event of difficulties (e.g. the vehicle having difficulties responding to the feature or other nearby changes). In such instances, the scouting system may cause the computing devices 110 to provide (e.g. audibly through a speaker and/or visually on a display of the vehicle) a notification to the test driver to indicate that they will be completing the scouting object so that the test driver is aware of the situation.

Figure 11:
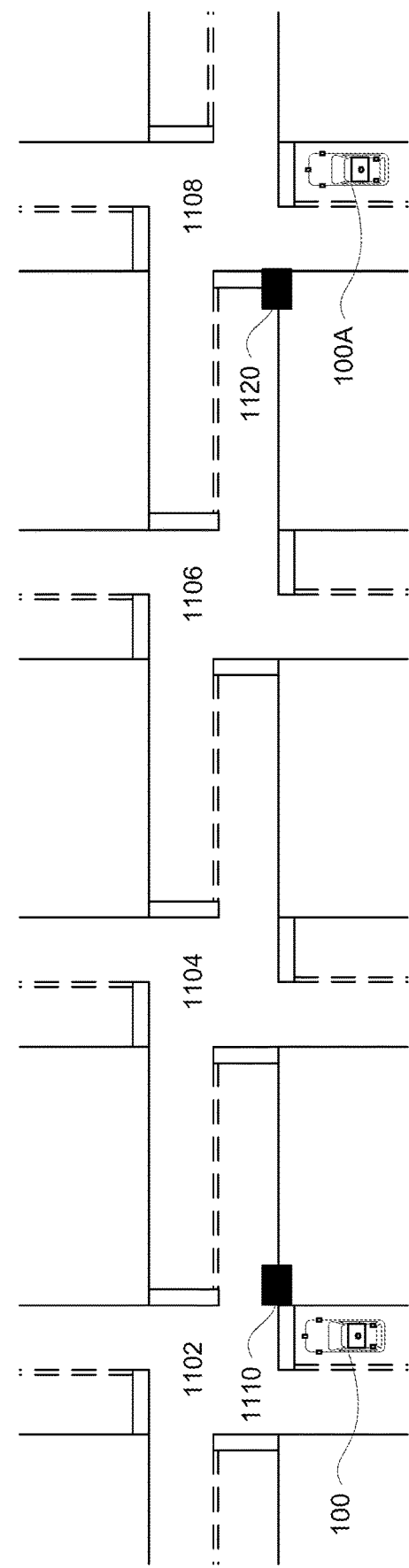
FIGS. 11-13 are an example of merging scouting objectives in accordance with aspects of the disclosure.
Figure 12:
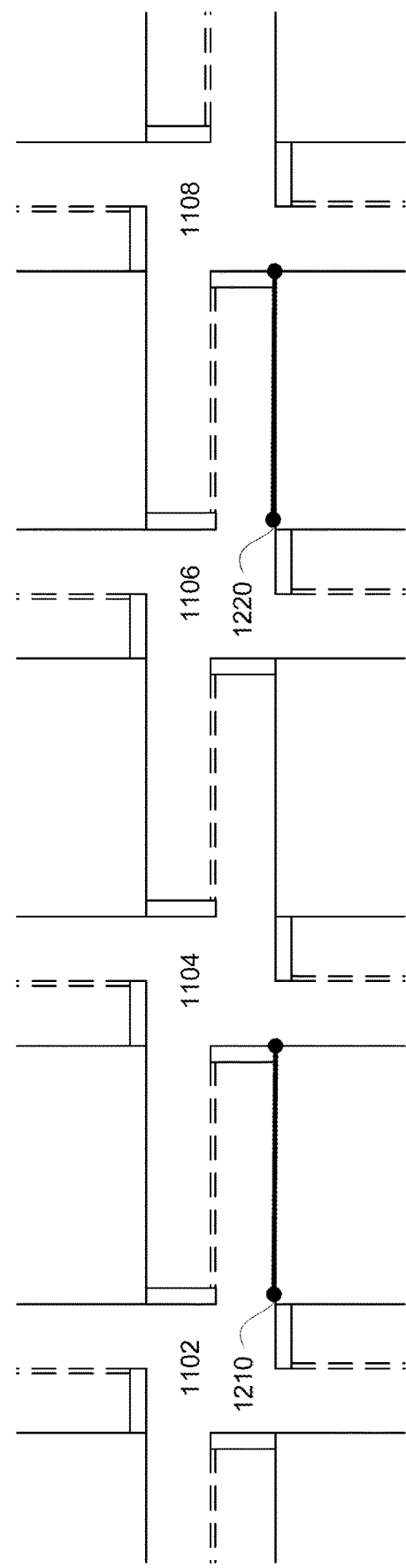
Figure 13:
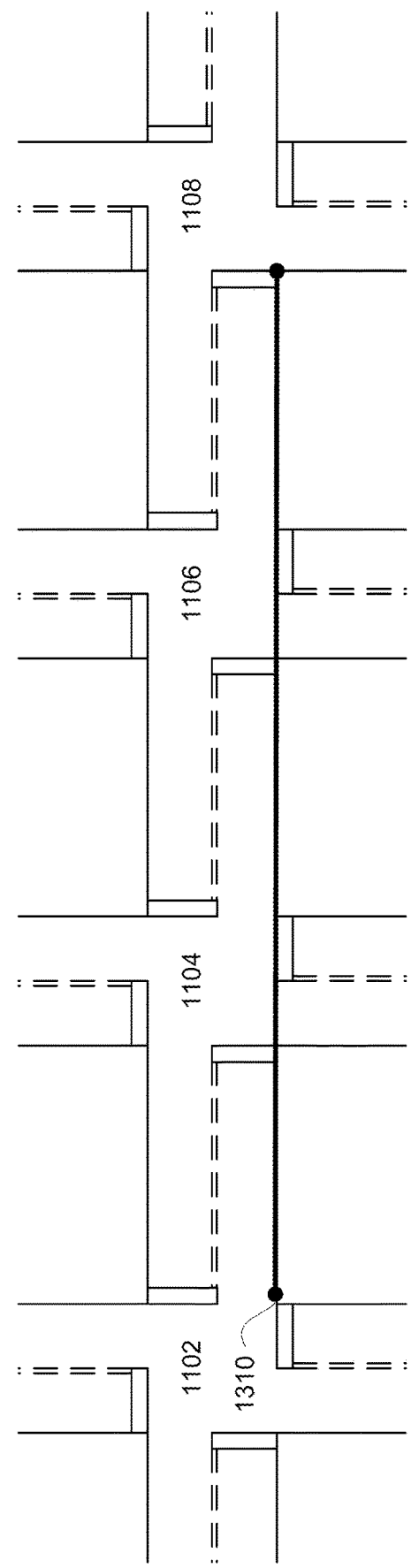

In some instances, multiple scouting objectives may be used to generate other scouting objectives. For example, FIG. 11 depicts two vehicles, vehicle 100 and vehicle 100A. Each vehicle identifies a change, represented by the areas 1110, 1120, respectively. As described above, a notification may be sent to the server computing devices 410, and the server computing devices may generate two scouting objectives 1210, 1220 by determining and connecting bounds as described above. In this example, scouting objective 1210 extends between intersections 1102 and 1104, and scouting objective 1220 extends between intersections 1106 and 1108. When each new scouting objective is generated, the server computing devices 410 may attempt to identify related scouting objectives in order to "merge" those scouting objectives into one larger scouting objective. For example, if scouting objective 1220, is the newest scouting objective, the server computing devices 410 may extend a line such as a ray or curve (e.g. a line that follows the curvature of the lanes or edges in the map information) along a lane of the map information from the area of the scouting objective 1220 to determine whether the line intersects with another scouting objective. When there is an intersection, and the two scouting objectives were based on common feature changes (e.g. a new or moved curb or lane line, a new or moved lane, etc.), these scouting objectives may be "merged" into a new, larger scouting objective 1310, covering the areas of both scouting objectives and between, may be generated, for instance by connecting the bounds of these scouting objectives as shown in FIG. 13. By creating these larger scouting objectives that cross intersections, the scouting system (and/or human operators) may now have the data available to propagate paths to scout the middle of these larger scouting objectives by traversing the scouting objectives in a path perpendicular to them.

As an alternative, an additional scouting objective may be generated some distance, such as one or two blocks away, from a new scouting objective. This additional scouting objective may have a similar area and observation requirement. For instance, if the new scouting objective is for a changed curb, the additional scouting objective may also be for a changed curb. In this regard, if data received for the additional scouting objective is analyzed and indicates a similar change as to the new scouting objective, further additional scouting objectives may be generated for additional blocks (e.g. 3 blocks, 4 blocks, 8 blocks, and so on using consistent, exponential, Fibonacci or other growth patterns).

In some instances, additional scouting objectives may be generated for certain types of features. Such additional scouting objectives may be generated using various heuristics and may be associated with the scouting objective to form a scouting task. For example, for lane line changes or additional/new lanes, additional scouting objectives which may extend beyond an intersection or driveway may be generated to ensure that any additional changes are scouted. As another example, if the location or configuration of a traffic signal light at an intersection changes, additional scouting objectives may be generated to check the location and configuration of all other traffic signals lights at that intersection. Similarly, if an unprotected left turn at an intersection becomes protected, additional scouting objectives may be generated to check the location and configuration of all other traffic signals lights at that intersection.

Once the scouting objective and any additional scouting objectives are generated, these may be used to capture information about the change. For example, the scouting objective and any additional scouting objectives may be sent by the scouting system to a subset of vehicles which meet the vehicle configuration for the scouting objective. Alternatively, the scouting objective and any additional scouting objectives may be sent to all vehicles of the fleet to allow those vehicles to determine whether or not they can actively (i.e. by driving to the observation location) or passively (by simply routing through the observation location while performing some other task) complete the scouting objective. This information may then be provided to the scouting system via reports of data collected at the observation locations sent over the network 460 and/or by other methods of downloading the information.

The scouting system may then track the location of the vehicles of the fleet. In some instances, the scouting system may determine whether these vehicles have accomplished the scouting objective (e.g. a vehicle with the vehicle configuration drives through the observation location and provides a report of data collected at the observation location). In addition or alternatively, as the vehicles of the fleet complete the scouting objective, the scouting system may receive data generated by these vehicles. If no vehicles drive through the observation location and/or send data generated from the scouting location within a certain period of time (such as a few hours, a day or more or less), the scouting system may flag the scouting objective for review by a human operator.

The received data may be sent to a mapping system and/or human operators in order to update the map information. The updated map information may then be sent to the vehicles of the fleet in order to keep the map information as up to date as possible.

In some instances, a confidence value may be included in the notification sent to the server computing devices. The confidence value may indicate how confident the computing devices 110 are in the change being an actual change. In such cases, the changes with higher confidence may automatically be used by the server computing devices 410 to generate new scouting objectives. Changes with lower confidence values may be sent for human review by the aforementioned remote assistance operators or another operator, and changes with really low confidence values might be scheduled for scouting to then get promoted to higher confidence (or go for human review).

Although the examples described above relate to changes detected with respect to specific features, other types of changes may be detected based on vehicle behavior. For instance, a notification may be sent in response to various systems of the vehicles noting a series of improperly predicted behaviors of other vehicles. Since the above-mentioned behavior prediction uses the map information, observing multiple vehicles with predicted trajectories which are inaccurate (i.e. because the vehicles do not follow those predictions) may suggest that the area of those predicted trajectories needs to be scouted for changes. In such examples, the scouting objectives may have an observation requirement that the vehicles of the fleet travel in the lane next to that lane or in the opposite direction through the intersection to observe what lane lines and/or road signs might have changed. For instance, if some minimum number or percentage of observed vehicles (e.g. 8 out of 10) are observed disobeying a particular traffic rule of the map information such as a right turn at a red light, going straight or making a right turn from a left-turn only lane, traveling the "wrong way" down a one-way street, etc. This may be used to generate and send a notification to the scouting system. In response, the scouting system may generate a new scouting objective.

As noted above, the scouting system may track the status of scouting objectives. Overtime, some scouting objectives may be pruned or discarded. For instance, if a vehicle has driven through the area of a scouting objective and reports an observation of no change or rather, that the features in the world are consistent with the map information, the scouting objective may be discarded. As another example, once a predetermined number of vehicles have driven through the area of a scouting objective and provided data, the scouting objective may be discarded. For instance, a predetermined number of reports (from one or more vehicles) may need to provide data for a new traffic light to be properly categorized for mapping purposes, for instance, to be able to observe all of the states of the lights of the traffic light when illuminated (e.g. green, red, yellow, flashing yellow, etc.). Once this has been completed, the scouting objective may be discarded. As another instance, a scouting objective may be discarded once the confidence about a feature's location reaches a certain threshold. For instance if a feature is first observed when a vehicle far away, then the recorded location of the observed feature may be in error by the angular distance between laser data points or pixels in a camera or other types of sensor inputs of the vehicle's perception system. If that error is unacceptable (e.g. too large), additional reports might be required to record a location that is more positionally accurate. As yet another instance, once a human operator has reviewed the data and confirmed that the map information has been updated with the change, the corresponding scouting objective or objectives from that change may be discarded. This may be especially useful in situations with long-term construction projects where a human operator may more readily determine when a construction project is complete.

The features described herein may provide for an efficient way to automatically generate scouting objectives when changes are detected. Moreover, since vehicles are able to detect changes passively and provide this information to the scouting system, this increases the speed at which scouting objectives can be generated and acted upon by other vehicles. In addition, because these new scouting objectives can be generated as a by-product of other things an autonomous vehicle might be doing while out and about, this may reduce the resources required to staff and organize other data collection efforts to confirm and update map information used by the vehicles and therefore may even streamline such operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    identifying, by one or more processors of one or more server computing devices, an area including a feature identified by a vehicle of a fleet of vehicles;
    generating, by the one or more processors, a scouting objective for the feature based on the identified area; and
    providing, by the one or more processors to at least one other vehicle of the fleet of vehicles, the scouting objective in order to enable the at least one other vehicle to scout the identified area for the feature according to the scouting objective.

2. The method of claim 1, wherein the feature is missing from a local version of map information used to control the vehicle in an autonomous driving mode.

3. The method of claim 1, wherein the feature is moved in a local version of map information used to control the vehicle in an autonomous driving mode.

4. The method of claim 1, wherein the feature is a new feature that does not appear in a local version of map information used to control the vehicle in an autonomous driving mode.

5. The method of claim 1, further comprising identifying, by the one or more processors, the area based on a perceptive range of the vehicle.

6. The method of claim 1, further comprising identifying, by the one or more processors, the area based on an entry or an exit of a roadway near the area.

7. The method of claim 1, further comprising identifying, by the one or more processors, the area based on an intersection of a roadway near the area.

8. The method of claim 1, further comprising generating, by the one or more processors, one or more additional scouting objectives for the at least one other vehicle to scout based on a type of the feature and the scouting objective.

9. The method of claim 1, further comprising: using, by the one or more processors, data collected by the at least one other vehicle in association with the scouting objective to update map information used to control the vehicle in an autonomous driving mode; and providing, by the one or more processors, the updated map information to the fleet of vehicles.

10. The method of claim 1, further comprising:
tracking, by the one or more processors, a status of the scouting objective; and
responsive to the status of the scouting objective being indicative of the scouting objective not being complete within a pre-determined period of time, flagging, by the one or more processors, the scouting objective for review.

11. The method of claim 1, further comprising identifying, by the one or more processors, a location corresponding to an extent to which the vehicle was able to observe the feature.

12. The method of claim 11, further comprising identifying, by the one or more processors, the area based on the identified location.

13. The method of claim 1, wherein generating the scouting objective further includes determining an observation location from where the identified area is to be observed by the at least one other vehicle.

14. The method of claim 13, wherein determining the observation location includes determining a lane requirement from which the at least one other vehicle is to approach the identified area.

15. The method of claim 14, wherein the lane requirement includes the at least one other vehicle to approach the identified area opposite of a flow of traffic of a lane adjacent to the identified area.

16. The method of claim 1, wherein generating the scouting objective further includes determining a vehicle configuration for the scouting objective.

17. The method of claim 16, wherein providing the scouting objective to the at least one other vehicle is further based on the vehicle configuration of the at least one other vehicle.

18. The method of claim 16, wherein the vehicle configuration includes no passengers in the at least one other vehicle.

19. The method of claim 16, wherein the vehicle configuration includes that the at least one other vehicle has a particular software version.

20. The method of claim 16, wherein the vehicle configuration includes the at least one other vehicle having a test driver who is able to take control of the at least one other vehicle.

* * * * *